Figure 1:
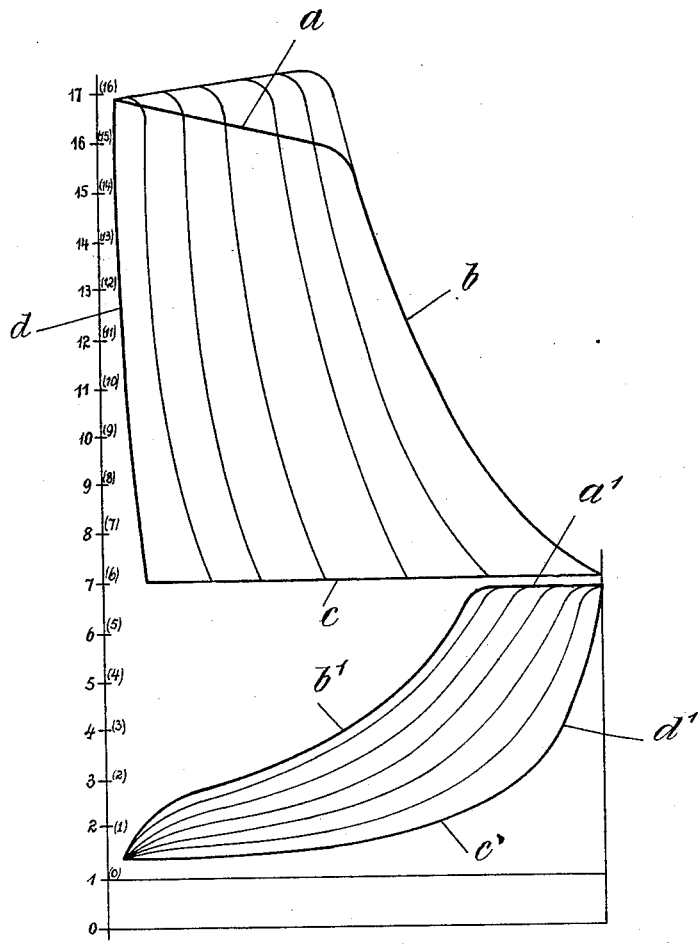

J. H. MISSONG.
CONTROLLING MEANS FOR STEAM ENGINES FOR THE UTILIZATION OF WASTE HEAT.
APPLICATION FILED JULY 9, 1912.

1,138,774.

Patented May 11, 1915.
4 SHEETS—SHEET 1.

Witnesses:
Paul Pmche
B. W. Fowler

Inventor:
Jacob Heinrich Missong,
By Briesen & Knauth
Attorneys.

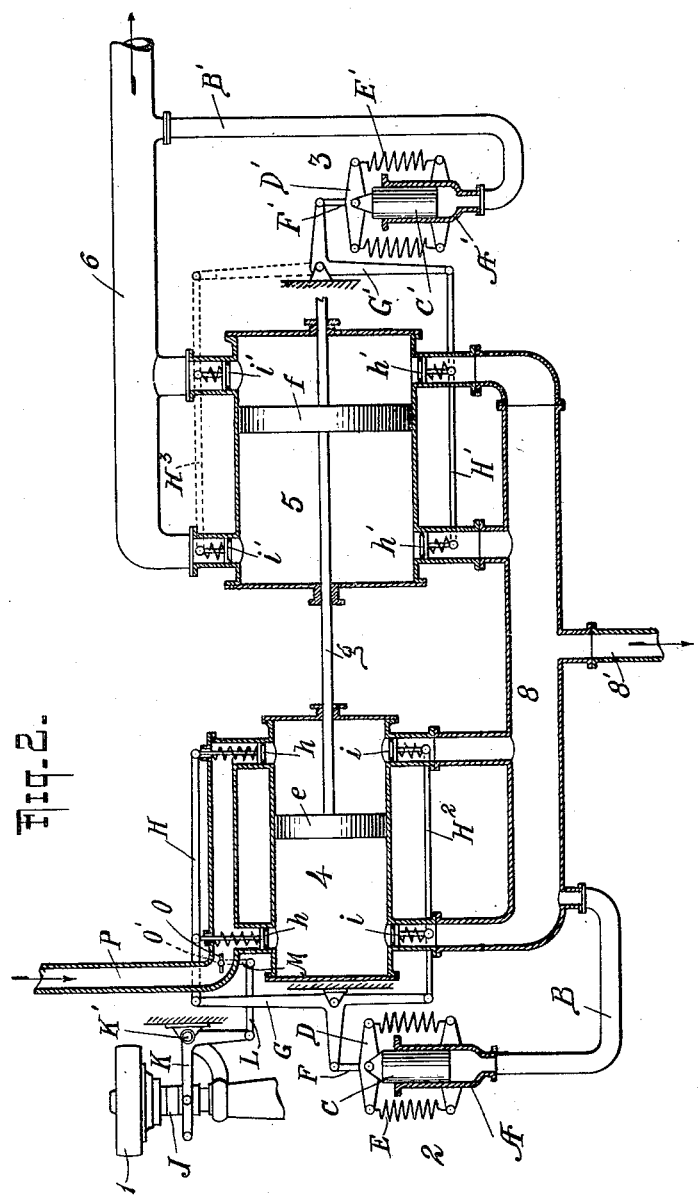

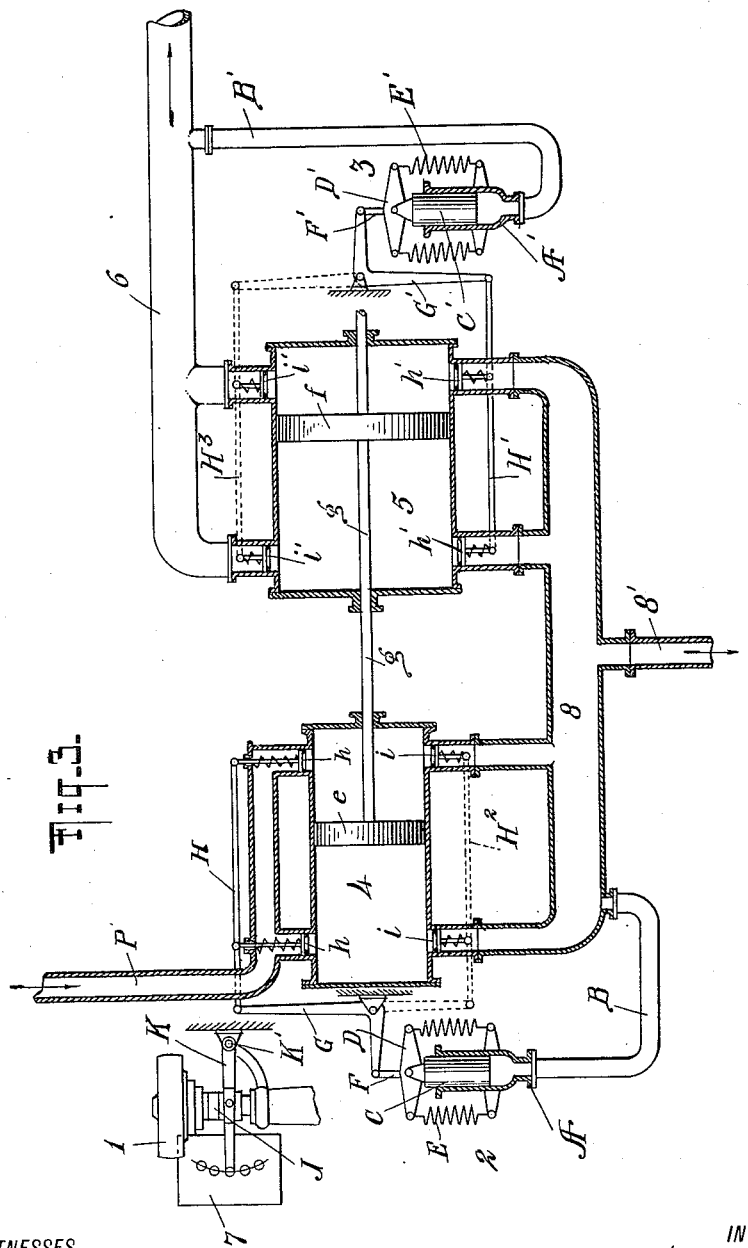

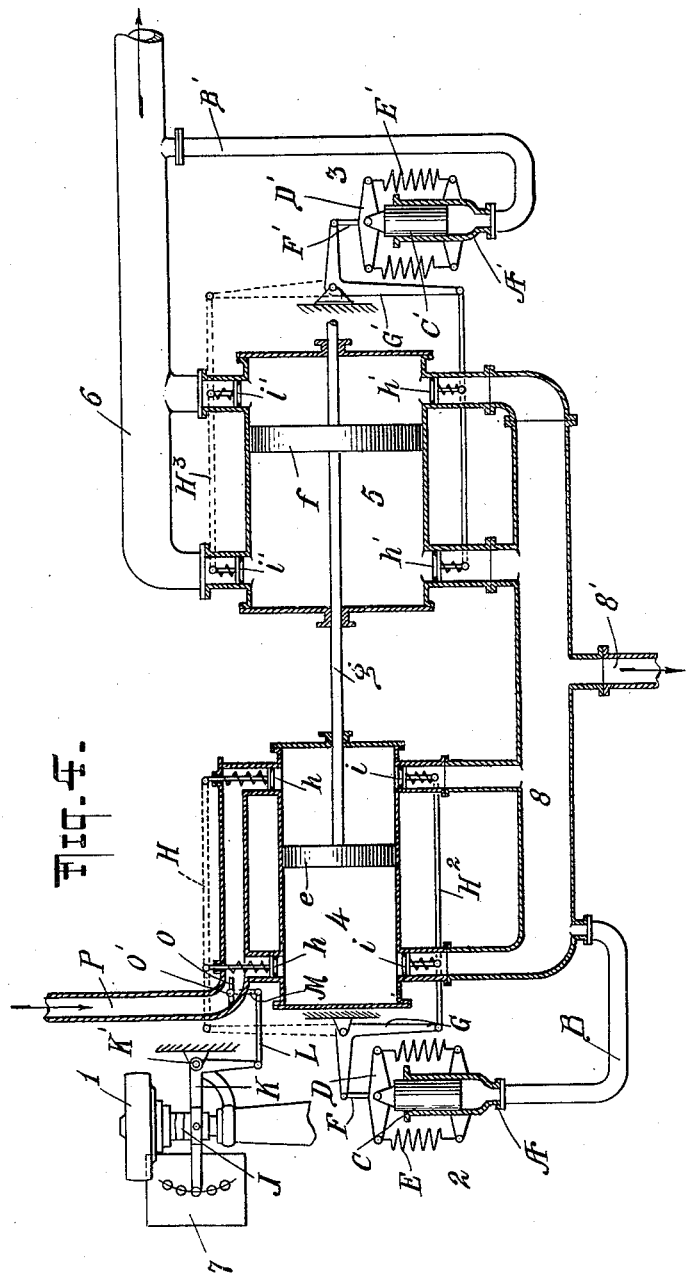

UNITED STATES PATENT OFFICE.

JACOB HEINRICH MISSONG, OF FRANKFORT-ON-THE-MAIN, GERMANY.

CONTROLLING MEANS FOR STEAM-ENGINES FOR THE UTILIZATION OF WASTE HEAT.

1,138,774. Specification of Letters Patent. Patented May 11, 1915.

Application filed July 9, 1912. Serial No. 708,447.

*To all whom it may concern:*

Be it known that I, JACOB HEINRICH MISSONG, chief engineer, a citizen of the German Empire, and resident of Frankfort-on-the-Main, Germany, with the post-office address Oederweg No. 126, have invented new and useful Improvements in Controlling Means for Steam-Engines for the Utilization of Waste Heat, of which the following is a specification.

My invention relates to steam engines in which the waste heat is utilized, and has for its purpose to regulate, by means of automatic pressure regulators or their equivalents, the quantity of exhaust steam, or the quantity of exhaust steam and of the intermediate steam, in the case of compound or multiple expansion engines, or multistage engines. According to my invention, the said automatic regulators are so arranged as to secure a complete utilization of the exhaust steam or waste steam for heating or cooking purposes, independently of the regulation of live steam admission by centrifugal governors.

The invention will now be described in detail with reference to the accompanying drawings, in which—

Figure 1 is a diagram illustrating the operation of a compound or double expansion (two-cylinder) engine according to my invention; and Figs. 2, 3 and 4 are diagrammatic cross sections of such a compound engine showing three different regulating arrangements embodying my invention.

In the examples illustrated, I have assumed that the engine is a two-cylinder compound or double-expansion engine, with intermediate steam extraction (say, for heating purposes) and utilization of the waste heat of the low pressure exhaust cylinder.

In the diagram, Fig. 1, admission line of the high pressure cylinder is designated by $a$ and that of the low pressure cylinder by $a'$, the expansion curve of the high pressure cylinder by $b$ and that of the low pressure cylinder by $b'$, further the two back pressure lines are indicated by $c$ and $c'$, and the two compression curves by $d$ and $d'$. It will be seen that the volumes of steam supplied to the cylinders depend on the lines $b$ and $b'$ and $d$ and $d'$ and the weight of steam depends, apart from these lines, also on the pressure lines $a$, $c$, $a'$ and $c'$. In most cases it is necessary to maintain the back-pressures, or the pressures of the intermediate and exhaust steam constant. Now since, for the sake of economy, the pressure of the live steam is also maintained as constant as possible, the quantities of steam supplied to the high pressure and to the low pressure cylinders are dependent on the position of the lines $b$, $d$, $b'$ and $d'$. Consequently these intermediate quantities may be controlled by automatic pressure regulators which, under the influence of the corresponding back-pressures, are caused to act on the steam inlet or outlet devices. Whether that influence is exerted on the position of the expansion curves ($b$ lines) or on the compression curves ($d$ lines), or both, depends on the conditions existing at the time for example on pressure fluctuations, loops in the diagram of expansion curves and the reconversion of positive energy into negative energy by premature compression.

The work done or output, like the quantities of steam, is always determined by the surfaces or areas confined by the lines $a$, $b$, $c$, $d$ and $a'$, $b'$, $c'$ and $d'$, that is to say, is likewise controllable by influencing the $a$, $b$ and $d$ lines. The output must of course be always varied in accordance with the load. Now as the diagram areas confined by the lines $a$, $b$, $c$, $d$ and $a'$, $b'$, $c'$, $d'$ correspond to the output and since in these diagrams the back-pressure lines $c$, $c'$ in the case of steam engines with complete utilization of the waste heat (intermediate steam or exhaust steam of the first stage and exhaust steam of the last stage) must be maintained at the particular pressure corresponding to the temperature required for the utilization of the exhaust steam for heating and boiling purposes, the back-pressures or the corresponding temperatures are for this reason maintained approximately constant by automatic pressure regulators, for which of course temperature regulators may also be substituted. Their position therefore is independent of variations in the output or of the quantities of exhaust steam. A very simple means for varying the output corresponding to the quantities of steam utilizable at the time being in accordance with the load consists in influencing the pressure of the live steam by a centrifugal governor provided with a throttling device. By maintaining all the back-pressure constant it is possible to completely utilize the waste heat.

This utilization is based on the assumption that the consumption of steam is not dependent, as in the present steam engines with only partial utilization of intermediate steam, on the output, but that the output is dependent on the utilization of the waste heat. The manner in which the obtainable or obtained output may be varied in accordance with the load will be seen from the following: Although the loss due to the throttling of the live steam pressure is so small as regards the utilization of heat as to be negligible, yet during heavy fluctuations of load it is quite considerable with regard to the output, and for this reason the load is so adjusted as to correspond with the output obtainable while at the same time not throttling the live steam pressure. This is attained by the adding of a load equal to the difference between the output obtainable and the load, this being effected in a simple manner, for example by converting the excess output into electric current and manually so adjusting the electric current regulator that the live steam pressure is only throttled to a very small extent or not at all. This addition of load can be automatically effected by causing a centrifugal governor to act on the $a$ line and to bring about the adjustment of the electric current regulator. The centrifugal governor may also be replaced by an automatic pressure regulator which is subjected to the influence of the live steam pressure. The automatic addition of any missing load takes place until the position of the $a$ line adjusted by the centrifugal governor coincides with the position allotted to it by the unthrottled live steam pressure or by the automatic pressure regulators. The steam outlets must take place in suitable receivers of such capacities that the predetermined back-pressures remain as constant as possible.

In Figs. 2, 3 and 4, I have shown a compound engine comprising a high pressure cylinder 4 and a low-pressure cylinder 5 arranged in tandem-fashion, the respective pistons $e$ and $f$ being connected by a rod $g$. Live steam is supplied through a conduit P to connections leading to the inlet valves $h$ located at opposite ends of the high pressure cylinder 4. From similarly located outlet valves $i$ the exhaust from said cylinder 4 passes to a receiver 8 provided with a branch 8' through which a portion of such exhaust steam may be diverted, for heating purposes or the like. The remaining portion of the high pressure exhaust passes from the receiver 8 into the low-pressure cylinder 5 through one or the other of the inlet valves $h'$ located at opposite ends of said cylinder. This latter also has outlet valves $i'$ controlling the passage of the low-pressure exhaust to the exhaust-pipe 6 which is connected with a heating apparatus (not shown) or any other device where the waste heat is to be utilized.

The receiver 8 also has a branch connection B leading to an automatic pressure regulator 2, and the exhaust pipe 6 has a branch connection B' leading to a similar pressure regulator 3. These regulators comprise stationary casings A, A' respectively, in which are mounted to slide plungers C, C' respectively provided with heads D, D' respectively to which are attached springs E, E' respectively tending to force the plungers C, C' toward the branches or conduits B, B' respectively. By means of links F, G, F', G', the heads D, D' are connected with mechanism (such as rods H, H', H², H³) controlling the inlet valves of the respective cylinders, or their outlet valves, or both the admission and the exhaust of steam.

The apparatus further comprises a centrifugal speed governor $l$ of any approved type, the sliding sleeve J of said governor operating a lever K fulcrumed at K'. In Figs. 2 and 4, this lever is an elbow lever connected by a link L with an arm M rigid with a throttle-valve O pivoted at O' in the live steam conduit P. In Fig. 3, the throttle-valve O is omitted, and the lever K forms part of the movable member of a switch or electric current regulator 7. In Fig. 4, the lever K is connected both with a throttle-valve O and with a current regulator 7. The purpose of this regulator is to adjust the load, as has been stated above, by converting the excess output into electric current.

In operation, if for instance the amount of steam diverted for heating purposes from the receiver 8 (connected with the conduit B) should increase, this will cause pressure to decrease in the receiver and in the conduit B and casing A, the plunger C being thereby operated either to keep the inlet valves of the high pressure cylinder open during a longer period, or to close the outlet valves of said cylinder at a later period, or to affect both the inlet valves and the exhaust valves. If at the same time the amount of steam remains constant at the low-pressure exhaust (connected with the conduit B'), the position of the plunger C', and consequently the operation of the valves of the low-pressure cylinder, will remain unaltered. If however the amount of steam taken from the low-pressure exhaust is increased, the plunger C' will at once change its position to change the operation or timing of the valves of the low-pressure cylinder in the same manner as has just been described with reference to the high-pressure cylinder. The plunger C will become operative alone when there are fluctuations exclusively in the amount of steam taken from the receiver connected with the conduit B; but if there are fluctuations either only in the amount of steam taken from the low-pressure exhaust (connected with conduit B'), or both in the amount of steam taken from the low-pressure exhaust and from the receiver, then both plungers C and C' will become operative to change the timing of the valves of both cylinders.

In Figs. 3 and 4 the centrifugal governor $l$ will automatically add or take off load by operating the regulator 7, and in Figs. 2 and 4 said governor will automatically govern the supply of live steam by operating the throttle valve O. Either one of these two modes of automatic regulation may be sufficient, as illustrated by Figs. 2 and 3 respectively, or they may be combined as exemplified by Fig. 4.

In the event of the quantities of the utilizable exhaust or intermediate steam being temporarily or permanently so small that the output produced is insufficient with live steam pressures of 12 to 20 atmospheres as at present used, for the required load, either the live steam pressure is raised high enough to render it possible or the engine is combined with one or more engines driven by the exhaust steam or intermediate steam or by both and controlled in any known manner. The combination may be of any known kind such as, for example, a tandem arrangement, a multiple crank or belt or rope or toothed gear or like driving arrangement, or Föttingers transformer or the like. Where the required output is at times equal to or smaller than the output produced by the volume of exhaust steam utilizable for heating and boiling purposes etc.; the coupled engines run idle or are thrown out of action.

From the above it is quite clear that the gist of the invention resides in the economical utilization of the exhaust steam and it is important that only so much exhaust steam should be given off as is really consumed.

In power generators, such as locomotives, ship engines, airship engines and the like, which do not run at constant speed, regulation by centrifugal force is replaced by manual regulation which may if desired be also substituted for automatic regulation.

The back-pressure of the lowest stage may be chosen below or above the atmospheric pressure. In the event of the pressure difference of the automatic pressure or temperature regulators being so small as to be too weak for direct transmission Servo motors may be employed.

Now what I claim and desire to secure by Letters Patent is the following:

1. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connection from each of said regulators to control either the inlet or the outlet of its stage, or both inlet and outlet of said stage, a centrifugal governor, and connections from said governor to compensate for variations in the amount of available waste steam.

2. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connections from each of said regulators to control the inlet of its stage, a speed governor, and connections from said governor to control the operation of the engine.

3. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connections from each of said regulators to control the outlet of its stage, a speed governor, and connections from said governor to control the operation of the engine.

4. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connections from each of said regulators to control both the inlet and the outlet of its stage, a speed governor, and connections from said governor to control the operation of the engine.

5. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connections from each of said regulators to control the operation of its stage, a speed governor, and connections from said governor to throttle the supply of live steam.

6. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connections from each of said regulators to control the operation of its stage, a speed governor, and connections from said governor to vary an additional load upon the engine.

7. In a compound steam engine in which the waste heat is utilized, the combination with the several stages of the engine, each of said stages having a steam inlet and a steam outlet, of separate automatic regulators, one for each stage of the engine, each regulator being under the influence of the exhaust of its stage, operative connections from each of said regulators to control the operation of its stage, a speed governor, and connections from said governor to throttle the supply of live steam and simultaneously to vary an additional load upon the engine.

In testimony, that I claim the foregoing as my invention, I have signed my name in presence of two witnesses, this twenty-ninth day of June 1912.

JACOB HEINRICH MISSONG.

Witnesses:
JEAN GRUND,
CARL GRUND.

Copies of this patent may be obtained for five cents each, by addressing the "Commissioner of Patents, Washington, D. C."